US011753701B2

United States Patent
Heinze et al.

(10) Patent No.: US 11,753,701 B2
(45) Date of Patent: Sep. 12, 2023

(54) NICKEL-BASED ALLOY FOR ADDITIVE MANUFACTURING AND METHOD

(71) Applicant: Siemens Energy Global GmbH & Co. KG, Bayern (DE)

(72) Inventors: Christoph Heinze, Markkleeberg (DE); Yves Küsters, Berlin (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 115 days.

(21) Appl. No.: 17/416,494

(22) PCT Filed: Dec. 6, 2019

(86) PCT No.: PCT/EP2019/083955
§ 371 (c)(1),
(2) Date: Jun. 20, 2021

(87) PCT Pub. No.: WO2020/135995
PCT Pub. Date: Jul. 2, 2020

(65) Prior Publication Data
US 2022/0064762 A1 Mar. 3, 2022

(30) Foreign Application Priority Data
Dec. 27, 2018 (DE) .................. 10 2018 251 722.3

(51) Int. Cl.
*C22C 1/04* (2023.01)
*B22F 10/28* (2021.01)
*C22C 19/05* (2006.01)
*B22F 10/25* (2021.01)
*B33Y 10/00* (2015.01)
*B33Y 70/00* (2020.01)

(52) U.S. Cl.
CPC ............ *C22C 1/0433* (2013.01); *B22F 10/25* (2021.01); *B22F 10/28* (2021.01); *C22C 19/055* (2013.01); *B22F 2301/15* (2013.01); *B33Y 10/00* (2014.12); *B33Y 70/00* (2014.12)

(58) Field of Classification Search
CPC . C22C 19/055; C22C 32/0026; C22C 1/0433; B22F 10/28; B22F 2301/15; B22F 10/25; B33Y 10/00; B33Y 70/00; Y02P 10/25
See application file for complete search history.

(56) References Cited

U.S. PATENT DOCUMENTS

| 3,749,612 | A | 7/1973 | Benjamin et al. |
| 3,785,876 | A | 1/1974 | Bailey |
| 3,890,816 | A | 6/1975 | Allen et al. |
| 4,039,330 | A | 8/1977 | Shaw |
| 4,439,248 | A | 3/1984 | Herchenroeder et al. |
| 2008/0101981 | A1 | 5/2008 | Arrell et al. |
| 2019/0048451 | A1* | 2/2019 | Ota ................. B22F 9/082 |
| 2019/0234313 | A1* | 8/2019 | Kray ................. F02C 7/32 |

FOREIGN PATENT DOCUMENTS

| DE | 2133186 A1 | 2/1972 |
| DE | 2216626 A1 | 5/1973 |
| DE | 2348248 A1 | 4/1974 |
| DE | 69908134 T2 | 1/2004 |
| EP | 3205442 A1 | 8/2017 |
| EP | 3257956 A1 | 12/2017 |
| JP | 2017082324 A | 5/2017 |
| JP | 2018003157 A | 1/2018 |
| JP | 2018168400 A | 11/2018 |
| WO | 2018155446 A1 | 8/2018 |

OTHER PUBLICATIONS

PCT International Search Report and Written Opinion of International Searching Authority dated Feb. 13, 2020 corresponding to PCT International Application No. PCT/EP2019/083955 filed Dec. 6, 2019.

* cited by examiner

*Primary Examiner* — John A Hevey
(74) *Attorney, Agent, or Firm* — WOLTER VAN DYKE DAVIS, PLLC

(57) ABSTRACT

An alloy is provided by the targeted selection of some elements of silicone, manganese, sulfur, chromium, titanium, aluminum, zirconium, tantalum, iron, copper, niobium, yttrium and yttrium oxide, which can be readily processed and also provides good mechanical characteristic values for the produced component.

13 Claims, No Drawings

NICKEL-BASED ALLOY FOR ADDITIVE MANUFACTURING AND METHOD

CROSS REFERENCE TO RELATED APPLICATIONS

This application is the US National Stage of International Application No. PCT/EP2019/083955 filed 6 Dec. 2019, and claims the benefit thereof. The International Application claims the benefit of German Application No. DE 10 2018 251 722.3 filed 27 Dec. 2018. All of the applications are incorporated by reference herein in their entirety.

FIELD OF INVENTION

The invention relates to a nickel-base alloy that can be used in additive manufacturing by means of selective energy irradiation, such as laser radiation, electron beams, or else powder application welding.

BACKGROUND OF INVENTION

Additive manufacturing, for example selective laser melting (SLM), but not limited to that method, is based on the slice-by-slice, selective melting of powder layers as starting material for production of a geometric object.

In the SLM of high-temperature-resistant alloys, microcracks occur during the process, and macrocracks during heat treatment.

Nickel-base materials can be built up in a crack-free and productive manner in a layer thickness up to 40 μm, but do not have adequate mechanical properties for some applications, such as creep resistance in particular. Moreover, oxidation resistance is often limited.

For exploration and industrialization of further additively manufactured hot gas components, however, an alloy with a suitable combination of mechanical properties and productivity is needed.

The problem has been solved to date by the use of other alloys, although this results in a restriction with regard to build quality and productivity (layer thickness 20 μm). More particularly, microcrack formation (in the SLM process) and macrocrack formation during heat treatment occur in the corresponding alloys, and so use of the SLM method with these alternative alloys limits utilization as manufacturing process for new parts, and the opportunities associated with the SLM method cannot be exploited.

SUMMARY OF INVENTION

The object of the invention is therefore to solve the abovementioned problem.

The object is achieved by an alloy as claimed in claim 1 and a method as claimed in claim 2.

The dependent claims list further advantageous measures that can be combined with one another as desired in order to achieve further advantages.

DETAILED DESCRIPTION OF INVENTION

The concept is that of a nickel-base superalloy, at least comprising (in % by weight), especially consisting of:
carbon (C) 0.13%-0.17%
chromium (Cr) 21%-22%
cobalt (Co) 18%-20%
tungsten (W) 1.8%-2.2%
titanium (Ti) 3.0%-3.4%
aluminum (Al) 2.1%-3.0%
boron (B) 0.008%-0.012%
zirconium (Zr) 0.0025%-0.01%
tantalum (Ta) 1.6%-2.5%
niobium (Nb) 1.2%-1.6%
optionally:
yttrium (Y) 0.0025%-0.0075%
yttrium oxide ($Y_2O_3$) 0.25%-1.25%
optionally and especially not more than:
vanadium (V) 0.01%
hafnium (Hf) 0.01%
silver (Ag) 0.005%
lead (Pb) 0.0003%
selenium (Se) 0.0003%
oxygen (O) 0.005%
gallium (Ga) 0.001%
bismuth (Bi) 0.0001%
nitrogen (N) 0.005%
magnesium (Mg) 0.007%
tellurium (Te) 0.00005%
thallium (Tl) 0.0005%
calcium (Ca) 0.0001%
potassium (K) 0.0001%
silicon (Si) 0.02%
manganese (Mn) 0.01%
iron (Fe) 0.02%
copper (Cu) 0.01%
phosphorus (P) 0.005%
sulfur (S) 0.001%
molybdenum (Mo) 0.1%
other impurities 0.1%
nickel (Ni) balance.

The reduced proportion of silicon (Si) and manganese (Mn) distinctly improves cracking behavior.

The low content of sulfur (S) increases the oxidation and corrosion resistance.

The chromium content (Cr) compensates for the proportion of the sigma phase with a higher γ' content.

The titanium content (Ti) is likewise selected in order to compensate for a γ' content with a higher proportion of tantalum (Ta) and aluminum (Al).

The content of aluminum (Al) improves creep properties and oxidation resistance.

The contents of zirconium (Zr), iron (Fe), copper (Cu) distinctly reduce propensity to cracking.

The addition of tantalum (Ta) distinctly improves creep properties, and the niobium content (Nb) increases strength.

The addition of yttrium oxide ($Y_2O_3$) improves oxidation resistance.

The adjustments detailed assure processability for a productive SLM process with improved mechanical properties and increased oxidation resistance.

No cracking is expected in heat treatment on account of aging phenomena, which has been confirmed experimentally and by simulation, and this reduces reworking expenditure, such as surface treatment.

The method used is preferably selective powder melting or selective powder sintering or application welding, powder application welding, or else selective laser sintering or selective laser melting.

The chromium content (Cr) is preferably 21.0% to 21.5%, especially 21.0% to 21.3%, very particularly 21.0% by weight.

The cobalt content (Co) is preferably 19% by weight.

The content of titanium (Ti) is preferably 3.0% by weight to 3.2% by weight, especially 3.0% by weight to 3.1% by weight, very particularly 3.0% by weight.

The content of aluminum (Al) is preferably 2.2% by weight to 2.4% by weight, especially 2.3% by weight to 2.4% by weight, very particularly 2.4% by weight.

The content of tantalum (Ta) is preferably 1.7% by weight to 1.9% by weight, especially 1.8% by weight to 1.9% by weight, very particularly 1.9% by weight.

The content of niobium (Nb) is preferably 1.4% by weight to 1.6% by weight, especially 1.5% by weight to 1.6% by weight, very particularly 1.6% by weight.

The carbon content (C) is preferably 0.15% by weight.

The tungsten content (W) is preferably 2.0% by weight.

The content of aluminum (Al) is preferably 2.4% by weight to 3.0% by weight, especially 2.6% by weight to 3.0% by weight, very particularly 3.0% by weight.

Advantages are also achieved with a preferable content of tantalum (Ta) of 1.9% by weight to 2.5% by weight, especially 2.2% by weight to 2.5% by weight, very particularly 2.5% by weight.

The invention claimed is:

1. A nickel-base superalloy consisting of (in % by weight):
    carbon (C) 0.13%-0.17%
    chromium (Cr) 21%-22%
    cobalt (Co) 18%-20%
    tungsten (W) 1.8%-2.2%
    titanium (Ti) 3.0%-3.4%
    aluminum (Al) 2.1%-3.0%
    boron (B) 0.008%-0.012%
    zirconium (Zr) 0.0025%-0.01%
    tantalum (Ta) 1.6%-2.5%
    niobium (Nb) 1.2%-1.6%
    yttrium (Y) 0.0025%-0.0075%
    optionally:
    yttrium oxide ($Y_2O_3$) 0.25%-1.25%
    optionally and especially not more than:
    vanadium (V) 0.01%
    hafnium (Hf) 0.01%
    silver (Ag) 0.005%
    lead (Pb) 0.0003%
    selenium (Se) 0.0003%
    oxygen (O) 0.005%
    gallium (Ga) 0.001%
    bismuth (Bi) 0.0001%
    nitrogen (N) 0.005%
    magnesium (Mg) 0.007%
    tellurium (Te) 0.00005%
    thallium (Tl) 0.0005%
    calcium (Ca) 0.0001%
    potassium (K) 0.0001%
    silicon (Si) 0.02%
    manganese (Mn) 0.01%
    iron (Fe) 0.02%
    copper (Cu) 0.01%
    phosphorus (P) 0.005%
    sulfur (S) 0.001%
    molybdenum (Mo) 0.1%
    other impurities 0.1%
    nickel (Ni) balance.

2. A method of producing a component from an alloy as claimed in claim 1, the method comprising producing the component from the alloy via an additive manufacturing method selected from the group consisting of selective powder melting, selective powder sintering, application welding, and powder application welding.

3. The method as claimed in claim 2, wherein the additive manufacturing method is selected from the group consisting of selective powder melting and selective powder sintering.

4. The alloy as claimed in claim 1,
    in which the chromium content (Cr) is 21.0% to 21.5%.

5. The alloy as claimed in claim 1,
    in which the cobalt content (Co) is 19% by weight.

6. The alloy as claimed in claim 1,
    in which the content of titanium (Ti) is 3.0% by weight to 3.2% by weight.

7. The alloy as claimed in claim 1,
    in which the content of aluminum (Al) is 2.2% by weight to 2.4% by weight.

8. The alloy as claimed in claim 1,
    in which the content of tantalum (Ta) is 1.7% by weight to 1.9% by weight.

9. The alloy as claimed in claim 1,
    in which the content of niobium (Nb) is 1.4% by weight to 1.6% by weight.

10. The alloy as claimed in claim 1,
    in which the carbon content (C) is 0.15% by weight.

11. The alloy as claimed in claim 1,
    in which the tungsten content (W) is 2.0% by weight.

12. The alloy as claimed in claim 1,
    in which the content of aluminum (Al) is 2.4% by weight to 3.0% by weight.

13. The alloy as claimed in claim 1,
    in which the content of tantalum (Ta) is 1.9% by weight to 2.5% by weight.

\* \* \* \* \*